United States Patent [19]

Yanagita et al.

[11] Patent Number: 5,098,785
[45] Date of Patent: Mar. 24, 1992

[54] MAGNETIC RECORDING MEDIUM CONTAINING A COPOLYMER HAVING AN ANIONIC FUNCTIONAL GROUP WHICH FORMS AN INTERMOLECULAR SALT

[75] Inventors: Takafumi Yanagita; Tsutomu Kempo; Narito Goto; Takuo Nishikawa; Noboru Koyama; Yasushi Nakano; Setsuko Kawahara, all of Hino, Japan

[73] Assignee: Konica Corporation, Tokyo, Japan

[21] Appl. No.: 439,800

[22] Filed: Nov. 21, 1989

[30] Foreign Application Priority Data

Nov. 21, 1988 [JP]  Japan ............................ 63-295664
Dec. 5, 1988 [JP]  Japan ............................ 63-308217
Sep. 14, 1989 [JP]  Japan ............................ 1-239579

[51] Int. Cl.$^5$ ............................................. G11B 23/00
[52] U.S. Cl. ................................. 428/332; 428/424.6; 428/425.9; 428/694; 428/900
[58] Field of Search ............... 428/900, 694, 425.9, 428/424.6, 332

[56] References Cited

U.S. PATENT DOCUMENTS

| | | | |
|---|---|---|---|
| 4,626,469 | 12/1986 | Yamaguchi et al. | 428/323 |
| 4,745,017 | 5/1988 | Miyoshi et al. | 428/141 |
| 4,770,941 | 9/1988 | Imai et al. | 428/411.1 |
| 4,839,225 | 6/1989 | Matsufuji et al. | 428/336 |
| 4,880,692 | 11/1989 | Ryoke et al. | 428/323 |

FOREIGN PATENT DOCUMENTS 58-179936  10/1983  Japan .

*Primary Examiner*—Merrell C. Cashion, Jr.
*Assistant Examiner*—Steven A. Resan
*Attorney, Agent, or Firm*—Jordan B. Bierman

[57] ABSTRACT

A medium recording medium is provided which has a plurality of coated layers on a nonmagnetic base support, a least one of said coated layer containing a modified copolymer having introduced therein an anionic functional group which forms an intramolecular salt.

7 Claims, No Drawings

MAGNETIC RECORDING MEDIUM CONTAINING A COPOLYMER HAVING AN ANIONIC FUNCTIONAL GROUP WHICH FORMS AN INTERMOLECULAR SALT

BACKGROUND OF THE INVENTION

The present invention relates to a magnetic recording medium such as magnetic tape, magnetic sheet and magnetic disk.

The use of finer magnetic particles in magnetic recording media, especially those for video and computer applications, has increased today in order to meet the demands for higher recording density and S/N ratio.

It is generally held that the S/N ratio of magnetic recording media (hereinafter sometimes referred to as "magnetic tape") is proportional to the square root of the number of magnetic particles in the recording material that are related to recording and reproduction. Thus, with the same weight of magnetic powder being applied, the S/N ratio can be effectively improved by using finer magnetic particles. However, as magnetic particles become finer, their surface activity will increase to make it difficult to disperse them uniformly. While various dispersants have conventionally been used to improve the dispersability of magnetic particles, they suffer the disadvantages that problems such as blooming and surface tack will arise if they are added in sufficient amounts to insure satisfactory dispersability.

If the size of magnetic particles is reduced to provide a higher BET value, the surface of the magnetic layer becomes smooth by a corresponding amount and the tape's endurance to repeated running decreases rather than increases. Magnetic tape makes vigorous contact with the magnetic head during recording and reproduction cycles and if it has an extremely smooth surface, the contact area and hence the frictional coefficient will increase to impair its running property. During repeated use of the tape, this can cause such consequent problems as the wear of the magnetic layer, shedding of the magnetic particles in said layer, and clogging of the magnetic head due to the shed particles.

If an even higher S/N ratio is required as in video tapes, not only are the magnetic particles refined but also nonmagnetic fillers such as carbon black and abrasives are removed from the magnetic layer to increase the loading density of magnetic particles. However, if carbon black is removed from the magnetic layer, the optical density of the magnetic tape is reduced to introduce difficulty in controlling tape running in such a way that it can be run or stopped at a desired time. Furthermore, electroconductivity is lost and static buildup will impair the tape durability to repeated running.

Further, when magnetic tape is caused to run on a video deck, not only its obverse surface but also its reverse surface undergoes abrasion by guide poles and rollers. Therefore, if the running property and the durability of the back surface of the tape are not good, an irregular and sudden tension will be exerted upon the running tape to cause excessive abrasion of the magnetic layer by the head. As a result, not only is the magnetic layer damaged but also the shedding of magnetic particles will occur. In addition, the tension at which the tape is wound varies constantly, causing unevenness in winding pressure and the form in which tape is wound up. As a result, the edges of turns of wound tape become nonuniform and this results in uneven running in subsequent use of the tape. All these phenomena contribute to deterioration of image and the electromagnetic characteristics of the tape as typified by skew, jitter and low S/N ratio.

With a view to overcoming these problems, it has been proposed that a back coat (hereinafter sometimes referred to as a "BC layer") be provided on the reverse side of magnetic tape. An example of such proposal is the inclusion and dispersing of an inorganic powder in a binder. This approach is intended to roughen the surface of the BC layer so that the area of contact with guide poles and rollers is sufficiently reduced to realize a lower coefficient of friction. See, for example, JP-A-57-130234 (the term "JP-A" as used herein means an "unexamined published Japanese patent application"), JP-A-57-53825, JP-A-58-161135 and JP-A-58-2415.

The use of carbon black in place of inorganic powders has also been proposed as in JP-B-52-17401 (the term "JP-B" as used herein means an "examined Japanese patent publication"). The technique disclosed in this publication aims at preventing static buildup by the electroconductivity of carbon black, as well as the light-shielding and surface-roughening effects of its particles. However, the carbon black particles used have very low dispersibility in paints or coating solutions. When a BC layer is formed by applying the resulting dispersion, the carbon black particles will agglomerate and produce coarse asperities on the surface. Further, such agglomerated particles adhere so weakly to the binder that they will easily shed off the surface. In addition, when the tape is wound and if adjacent turns contact each other, large agglomerated particles in the back coat of one layer will produce asperities on the magnetic coating of the adjacent layer.

With a view to avoiding the aforementioned problems with the obverse and reverse faces of magnetic tapes, it has been proposed in JP-A-58-164020, JP-A-61-276120 and JP-A-62-188018 that an undercoat of a carbon black containing resin be provided. However, the dispersability of carbon black in the undercoat is still too poor to avoid the formation of asperities, which will consequently produce asperities in the magnetic layer to induce a lower S/N ratio. Further, the adhesion between the base support, undercoat and magnetic layer is so weak as to induce separation of these layers.

In order to disperse magnetic particles and fillers, it is necessary to perform prolonged mixing and dispersing operations and to use dispersants in large quantities. But this has inevitably impaired the characteristics of tape and deterioration of the surface properties and it has thus been difficult to improve dispersability by a desired degree.

Under these circumstances, modified binder resins that have anionic functional groups introduced therein to assist in dispersing magnetic particles and carbon black have been studied and they have proved to be effective in some way. However, even such modified resins are still unsatisfactory in their ability to disperse magnetic particles, in particular carbon black particles, having a high BET value.

SUMMARY OF THE INVENTION

A primary object, therefore, of the present invention is to provide a magnetic recording medium, having a plurality of coated layers on a nonmagnetic base support that has strong enough adhesion between said coated layers to avoid spalling, that can be run and stopped in a reliable way, that is characterized by uniform dispersion and high loading of magnetic particles, and that features a high degree of surface smoothness of the magnetic layer to insure high S/N ratio.

Another object of the present invention is to provide a magnetic recording medium which provides sufficient output and which is superior in electromagnetic property.

Still another object of the present invention is to provide a magnetic recording medium having a high level of electromagnetic property and running durability together.

These objects of the present invention can be achieved by a magnetic recording medium having a plurality of coated layers on a nonmagnetic base support, at least one of said coated layers containing a modified copolymer having introduced therein an anionic functional group which forms an intramolecular salt.

According to a preferred embodiment of the magnetic recording medium of the present invention, a magnetic recording medium is provided, wherein, of a plurality of coated layers on a nonmagnetic base support, at least one layer is a magnetic layer containing at least magnetic particles and a binder, at least one other layer is an intermediate layer provided between said nonmagnetic base support and said magnetic layer, said intermediate layer containing carbon black particles dispersed in said binder, and the binder contained in at least one of said magnetic layer and said intermediate layer is a modified copolymer having introduced therein an anionic functional group which forms an intramolecular salt.

According to another preferred embodiment of the magnetic recording medium of the present invention, a magnetic recording medium is provided, wherein a plurality of coated layers on a nonmagnetic base support are a plurality of magnetic layers consisting of an upper layer and a lower layer, and the binder contained in at least one of said magnetic layers is a modified copolymer having introduced therein an anionic functional group which forms an intramolecular salt.

According to still another preferred embodiment of the present invention, a magnetic recording medium is provided, wherein at least one of said plurality of magnetic layers has incorporated therein carbon black particles having an average particle size of 15 m$\mu$ or more but no more than 30 m$\mu$, carbon black particles having an average particle size of 40 m$\mu$ or more, and a binder which is a modified copolymer having introduced therein an anionic functional group which forms an intramolecular salt.

According to still anther preferred embodiment of the present invention, a magnetic recording medium having a plurality of magnetic layers on a magnetic base support is provided, wherein the upper magnetic layer contains a modified copolymer having introduced therein an anionic functional group which forms an intramolecular salt and the lower magnetic layer does not contain a curing agent.

According to still another preferred embodiment of the present invention, a magnetic recording medium is provided which has a magnetic layer and an intermediate layer provided on each side of a nonmagnetic base support, said intermediate layer being provided between said base support and said magnetic layer, wherein at least one of said magnetic and intermediate layers on each side of said base support contains a binder which is a modified copolymer having introduced therein an anionic functional group which forms an intramolecular salt.

In the magnetic recording medium of the present invention wherein plurality of coated layers provided on a nonmagnetic base support, the intermediate layer helps adjust the overall optical density of the magnetic tape to an appropriate level that insure reliable control over tape running but also eliminates problems due to static buildup. The intermediate layer may be used as an undercoat for insuring adhesion between layers.

DETAILED DESCRIPTION OF THE INVENTION

The intermediate layer formed in the present invention contains carbon black in an amount generally ranging from 10 to 500 parts by weight preferably from 20 to 400 parts by weight, per 100 parts by weight of binder. The thickness of the intermediate layer generally ranges from 0.1 to 2.0 $\mu$m, preferably from 0.2 to 1.5 $\mu$m, on a dry basis. Its transmittance to light having a wavelength of 9000 Å is adjusted to lie between 1 to 10%, with the overall transmittance of magnetic tape being adjusted to no more than 2%. The intermediate layer is also effective in preventing troubles due to static buildup. If the light transmittance of the intermediate layer is less than 1%, the binder is no longer capable of retaining carbon black particles and the strength of that layer will decrease. If the light transmittance of the intermediate layer exceeds 10%, the overall transmittance of the magnetic tape cannot be reduced to 2% or below and the tape cannot be controlled to run in a consistent way.

The surface of the magnetic layer preferably has a center-line-average roughness (Ra) of no more than 0.01 $\mu$m, more preferably in the range of 0.005–0.009 $\mu$m at a cutoff value of 0.08 mm.

Examples of carbon black that can be used in the present invention for light-shielding purposes include Raven 2000 (BET specific surface area, 190 m$^2$/g; particle size (r), 18 m$\mu$), 2100, 1170 and 1000 of Columbia Carbon Corp.; and #100, #75, #40, #35 and #30 of Mitsubishi Kasei Corp. In the following description, the units of measurement of BET, r and DBP absorption (i.e., m$^2$/gr, m$\mu$ and ml/100 gr) are omitted.

Examples of electroconductive carbon black that can be used in the present invention include: Conductex 975 (BET, 250; DBP absorption (hereinafter referred to simply as DBP), 170; r, 24), Conductex 900 (BET, 125; r, 27), Conductex 40–220 (r, 20), and Conductex SC (BET, 220; DBP, 115; r, 20) of Columbia Carbon Corp.; Vulcan XC-72 (BET, 254; r, 30), Vulcan P (BET, 143; DBP, 118; r, 20), Raven 1040, Raven 420 and Black Pearls 2000 (r, 15) of Cabot Corp.; and #44 of Mitsubishi Kasei Corp.

Other examples of carbon black that can be used in the present invention include: Conductex-SC (BET, 220; DBP, 115; r, 20) of Columbia Carbon Corp.; Vulcan 9 (BET, 140; DBP, 114; r, 19) of Cabot Corp.; #80 of Asahi Carbon Co., Ltd. (BET, 117; DBP, 113; r, 23); HS 100 of Denki Kagaku Kogyo K.K. (BET, 32; DBP, 180; r, 53); #22B (BET, 55; DBP, 131; r, 40), #20B (BET, 56; DBP, 115; r, 40) and #3500 (BET, 47; DBP, 187; r, 40) of Mitsubishi Kasei Corp. Additional examples include: CF-9, #4000 and MA-600 of Mitsubishi Kasei Corp.; Black Pearls L, Monarch 800, Black Pearls 700, Black Pearls 1000, Black Pearls 880, Black Pearls 900, Black Pearls 1300, Black Pearls 2000 and Sterling V of Cabot Corp.; as well as Raven 410, Raven 3200, Raven 430, Raven 450, Raven 825, Raven 1255, Raven 1035, Raven 1000, Raven 5000 and Ketschen Black PC of Columbia Carbon Corp.

In the magnetic recording medium of the present invention, a modified copolymer having introduced therein an anionic functional group which forms an intramolecular salt is contained as a binder in at least one of a plurality of coated layers. Said coated layers containing such modified copolymer comprises an intermediate layer and/or a magnetic layer. Examples of the modified copolymer to be used as a binder in the intermediate layer and/or the magnetic layer that has therein an anionic functional group which forms an intramolecular salt include modified vinyl chloride based copolymers having introduced therein an anionic functional group which forms an intramolecular salt and modified polyurethane based copolymer having introduced therein an anionic functional group which forms an intramolecular salt.

The modified vinyl chloride based copolymer for use in the present invention is preferably represented by the following general formula (I). The order in which the parenthesized recurring units in the copolymer as bracketed in the general formula are subjected to block polymerization may or may not be specified.

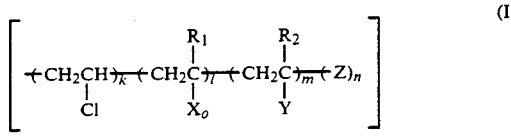

where $R_1$ and $R_2$ each represents a hydrogen atom or a lower alkyl group (e.g. $CH_3$ or $C_2H_5$), which $R_1$ and $R_2$ may be the same of different in the respective blocks of recurring units;

$X_o$ represents a substituent —A—X containing a group such as a betaine group that forms an intramolecular salt; Y represents a substituent

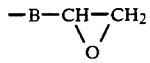

containing an epoxy group;

A and B each represent a linkage group for linking an intramolecular salt forming group or an epoxy group to the backbone chain of the copolymer, which linkage group may be exemplified by the following:

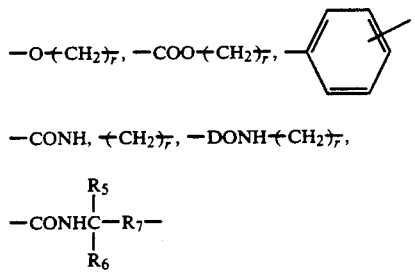

(where $R_5$ and $R_6$ each represents a hydrogen atom, a alkyl group having 1-15 carbon atoms or a phenyl group; $R_7$ is an alkylene group having 1-15 carbon atoms; and r is an integer of 0-20).

The epoxy group introduced into the modified vinyl chloride based copolymer is effective in minimizing dehydrochlorination that might occur during heating of the modified vinyl chloride base copolymer or with the lapse of time. The present inventors found that the appropriate range of the epoxy content was from 0.5 to 3 wt % from the viewpoints of the glass transition point (Tg) of said copolymer and its solubility. If the epoxy content is less than 0.5 wt %, dehydrochlorination cannot be suppressed by a satisfactory degree. If the epoxy content exceeds 3 wt %, the physical properties of the resin are impaired.

Symbol Z in the general formula (I) represents a recurring unit which is optionally inserted to improve the characteristics of said modified copolymer by adjusting its solubility in solvents, flexibility, miscibility with other resins and curability through crosslinking, by further enhancing the dispersing ability of said modified copolymer, or by improving its surface lubricating property.

In the general formula (I), k, l, m and n represent integers of 200-800, 1-100, 1-100 and 0-200, respectively.

From the viewpoint of dispersing ability, the modified vinyl chloride based copolymer used in the present invention preferably has a degree of polymerization (Pn) in the range of from 250 (inclusive) to 500 (inclusive) and contains vinyl chloride units in an amount of 95-80 wt %.

When the modified copolymer represented by the general formula (I) is sued as a binder for the magnetic recording medium and exhibits the necessary functional effects, the recurring vinyl chloride unit contributes to the strength of said medium. If the vinyl chloride content is too low, the physical property (mechanical strength) necessary for the magnetic recording medium is not attained. If the vinyl chloride content is too high, the solubility of the modified copolymer in solvents is reduced and its glass transition point (Tg) tends to increase.

The recurring unit containing an epoxy group improves the heat stability of the modified vinyl chloride based copolymer. At the same time, it reacts with a crosslinking or curing agent such as isocyanate to crosslink the binder to a higher molecular weight. In this way, the epoxy containing recurring unit takes part in bonding to other binder resins such as polyurethane, thereby preventing dehydrochlorination and improving heat stability and durability such as wear resistance. This recurring unit is also effective in adjusting the glass transition point (Tg) of the binder resin and its placticizing effect by means of controlling its content. Hence, said recurring unit is complementary in action to a reactive hydroxyl group (—OH) such as vinyl alcohol.

The recurring unit having an intramolecular salt forming group such as a betaine group contributes to dispersing ability. If the content of this recurring unit is too low, the desired effect is not attained. Even if it is contained in an excessive amount, no commensurate improvement in dispersing ability will be accomplished. To the contrary, the moisture resistance of the resin will be impaired.

Besides the recurring units described above, the modified vinyl chloride based copolymer used in the present invention may contain as the $-(Z)_n$ component a recurring unit that has a hydrophilic functional group such as a carboxyl group or a metal-substituted carboxyl group (—COOM where M is an alkali metal such as Li, Na or K). One of the major purposes of incorporating this recurring unit is to improve the dispersing ability. The carboxyl group is effective in improving the ability of the binder to retain and disperse magnetic particles (e.g. iron oxides and metal powders). The introduction of an OH group contributes to dispersing ability, curability through crosslinking, miscibility with other resins and solubility in solvents.

The modified vinyl chloride based copolymer to be used in the present invention can be synthesized by the following general procedure. Reactive monomers having unsaturated bonds from which the recurring units shown in the general formula (I) are charged in predetermined amounts into a reactive vessel such as an autoclave and polymerized using a common initiator such as a radial polymerization initiator exemplified by BPO (benzoyl peroxide) or AIBN (azobisisobutyronitrile), a redox polymerization initiator, an anionic polymerization initiator or a cationic polymerization initiator. Thereafter, the reaction product is dried and optionally pulverized or otherwise treated to obtain an predominantly white powder.

Specific examples of the reactive monomer for introducing an epoxy group include glycidyl acrylate, glycidyl methacrylate and glycidyl vinyl ether, which may be used either on their own or as admixtures. Specific examples of the reactive monomer for introducing sulfonic acid or a salt thereof include unsaturated hydrocarbon sulfonic acids such as 2-acrylamido-2-methylpropanesulfonic acid, vinylsulfonic acid, allylsulfonic acid, methacrylsulfonic acid and p-styrenesulfonic acid, and salts thereof. Other examples are sulfoalkyl esters of acrylic or methacrylic acid such as sulfoethyl methacylate and sulfopropyl methacrylate, and salts thereof. These monomers may also be used either on their own or as admixtures.

If a carboxylic acid residue or a salt thereof (—COOM) must be introduced as Z component, acrylic acid, methacrylic acid, maleic acid or salts thereof may be used.

Illustrative oil-soluble radical polymerization initiators include azo compounds and organic peroxides. Azo compounds that can be used include 2,2'-azobisisobutyronitrile, 2,2'-azobis (2,4-dimethylbutyronitrile), 2,2'-azobis (2,3,3-trimethylbutyronitrile) and 2,2'-azobis(2,4-dimethylvaleronitrile). Organic peroxides that can be used include: diacyl peroxides such as acetyl peroxide, isobutyryl peroxide, benzoyl peroxide, diisopropyl peroxydicarbonate and di-2-ethylhexyl peroxydicarbonate; and peroxy esters such as t-butylperoxyisobutyrate and t-butylperoxylaurate. Needless to say, these oil-soluble radical polymerization initiators may also be used as admixtures. From the viewpoint of safety in handling and performance, azo compounds are preferred, with 2,2'-azobisisobutyrontrile and 2,2'-azobis(2,4-dimethylvaleronitrile) being particularly preferred. The amount in which the initiators are to be used cannot generally be specified but the range of 0.2-2.0% of the monomer weight will usually serve the purpose. If the polymerization system is excessively acidic, the ring opening of an epoxy group will arise during the polymerization. If, on the other hand, the polymerization system is excessive alkaline, the produce polymer will undergo hydrolysis. Therefore, the pH of the polymerization system is adjusted to lie between 2 and 9, preferably between 2 and 7. Polymerization temperature depends on the type of initiator used. The higher the temperature, the greater the chance that an epoxy group of undergoing the reaction of ring opening or the higher the possibility that part of the polymer is emulsified to cause emulsion polymerization, which will lead to such problems as the formation of a latex-like fine polymer. Therefore, it is generally recommended that polymerization be performed at 80° C. or below, preferably within the temperature range of 40°70° C.

The following are non-limiting examples of a modified vinyl chloride based copolymer having a betaine-type intramolecular salt forming group that is represented by the general formula (I) and which is preferably used in the present invention.

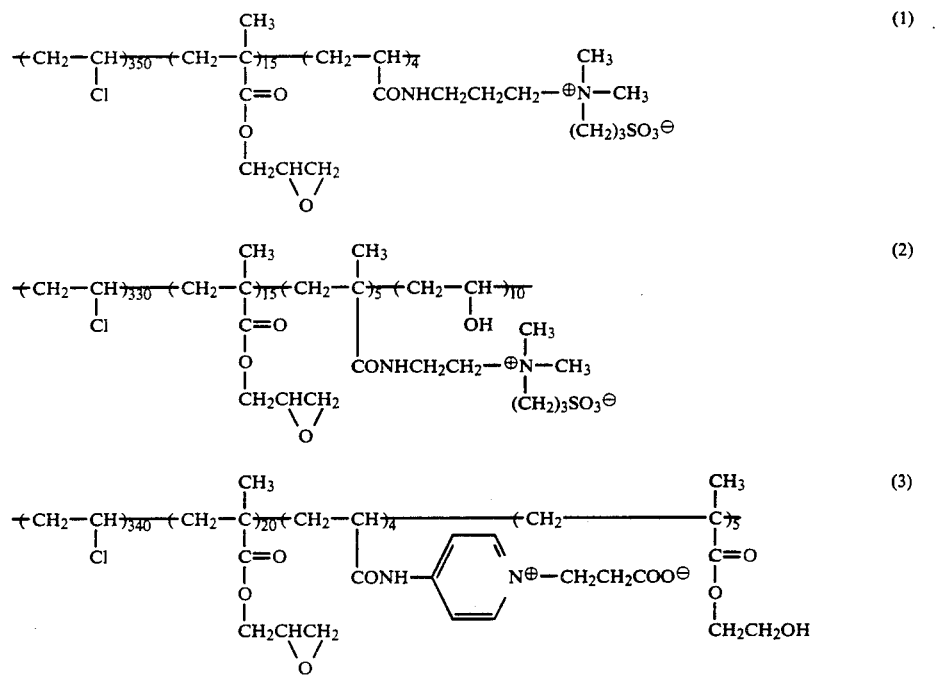

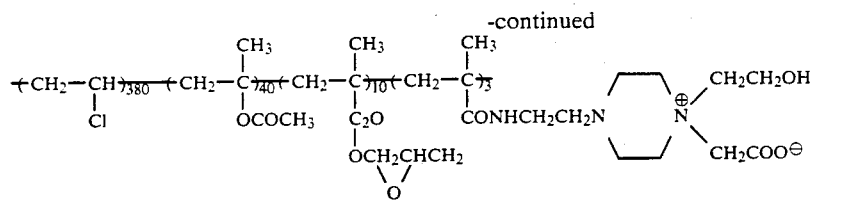

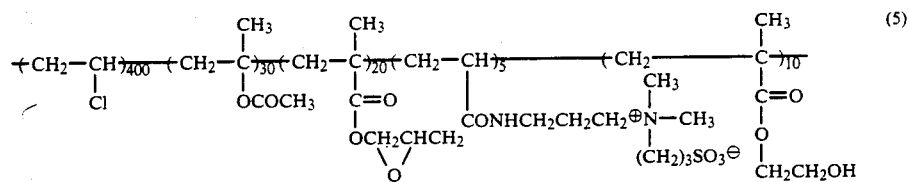

Specific examples of synthesis are described below.

Synthesis 1 (synthesis of the starting material for polymerizable betaine monomer compound (1))

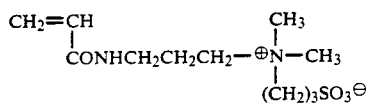

One mole (156.2 g) of N-(N',N'-dimethyl-3-aminopropyl)acrylamide and 300 ml of methanol are charged into a flask in the presence of 0.5 g of fenothiazine as a polymerization inhibitor and stirred under cooling with ice water.

To the reaction mixture, 112 g (1 mol) of propane sultone and 350 ml of methanol are added. Thereafter, the flask is heated until the system becomes about 60° C. and the mixture is stirred for 10 h. After completion of the reaction, the reaction product is crystallized in a large amount of acetone.

| Synthesis 2 | |
|---|---|
| Deionized water | 130 (parts) |
| Methyl cellulose | 0.6 |
| Partial ester of polyoxyethylene sorbitan and aliphatic acid | 0.2 |
| Trichloroethylene | 0.5 |

These ingredients are charged into a polymerization vessel, which is evacuated and degassed and charged with 87 parts of vinyl chloride and 20 parts of glycidyl methyl methacrylate, followed by stirring at 58° C. Thereafter, 0.42 parts of 3,3,5-trimethyl hexanoyl peroxide is added to initiate polymerization while at the same time a mixture with 3 parts of the polymerizable betaine monomer, dissolved in 40 parts of methanol, as obtained in Synthesis 1 is charged continuously at a constant rate so that is will be totally consumed in 8 h. After 12 h of the reaction when the pressure in the polymerization vessel reaches 3 kg/cm², the unreacted vinyl chloride is recovered and the resulting copolymer is recovered after removing the liquid content. The recovered copolymer is washed with cold water and dried to obtain copolymer (1).

The modified polyurethane based polymer having an anionic group that forms an intramolecular salt is explained hereunder. Said polyurethane based copolymer may be synthesized by a common method of polyurethane synthesis, that is, by reacting a high-molecular weight (500-3000) polyol such as polycarbonate polyol, polyester polyol, polyactone polyol or polyether polyol with a polyfunctional aromatic or aliphatic isocyanate. In this way, a polycarbonate polyurethane carbonated with polyester polyurethane, polyether polyurethane, phosgene or diphenyl carbonate is synthesized.

These polyurethane are chiefly produced by reacting a polyisocyanate with a polyol and optionally with another copolymer. They may be in the form of a urethane resin or a urethane prepolymer containing a free isocyanate group and/or a hydroxyl group, or in the form containing no such reactive terminal groups such as in urethane elastomer. The isocyanate component may be selected from among various diisocyante compounds such as hexamethylene diisocyante (HMDI), diphenylmethane diisocyante (MDI), hydrogenated MDI (H₁₂ MDI), tolylene diisocyanate (TDI), 1,5-naphthalene diisocyante (NDI), trizine diisocyanate (TODI), lysine diisocyante methyl ester (LDI) and isophorone diisocyante (IPDI). If necessary, lower-molecular weight polyfunctional alcohol such as 1,4-butanediol, 1,6-hexanediol and 1,3-butanediol may be used to adjust the molecular weight, physical properties, etc. of the resin.

Functional groups that form intramolecular salts may be introduced into the isocyanate component. If desired, they may be introduced into the polyol component or even into the low-molecular weight polyfunctional alcohol described above.

Polyester polyols in which anionic functional groups form intramolecular salts may be synthesized by performing polycondensation between various dicarboxylic acid components, polyhydric alcohol components and dicarboxylic acid components in which anionic functional groups form intramolecular salts and/or polyhydric alcohol components in which anionic functional groups form intramolecular salts. Exemplary dicarboxylic acid components are terephthalic acid, isophthalic acid, sebacic acid, adipic acid, dimerized linoleic acid and maleic acid. Exemplary polyhydric alcohol components include glycols such as ethylene glycol, propylene glycol, butylene glycol and diethylene glycol, and polyhydric alcohols such as trimethylolpropane, trimethylolethane and pentaerythritol. These polyhydric alcohol components may be used as admixtures.

The polycarbonate polyol having an anionic functional group which forms an intramolecular salt may be synthesized generally by ester interchange of polyalcohol with dialkylcarbonate or diarylcarbonate, or by condensation of polyalcohol with phosgene.

In the preparation of said polyester polyol and polycarbonate (including polycarbonate polyester polyol) or in the reaction of polycarbonate polyol with polyisocyanate, the following aromatic polyalcohol may be used.

Aromatic polyalcohol

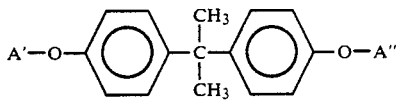

[n is 1 or 2; A' is

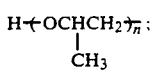

and A" is

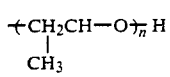

where n is 1 or 2.]

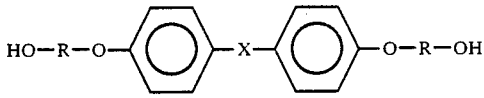

[R is $-(CH_2)_2-$ or $-CH(CH_3-CH_2-CH_2-$; and X is $-SO_2-$, $-CO-$, $-C(CH_3)_2$ or $-(CH_3)_2$; $C_6H_4-C(CH_3)_2$]

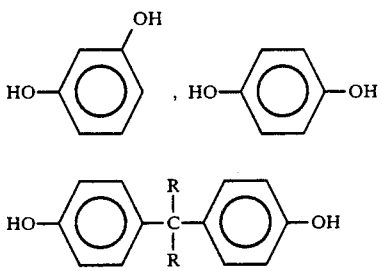

[R is a hydrogen atom or an alkyl group having 1 to 3 carbon atoms; and R' is a hydrogen atom, an alkyl group having 1 to 7 carbon atoms or an alkyl group.]

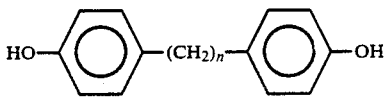

[n is an integer of 1 to 10]

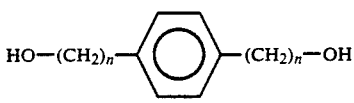

[n is 1 or 2]

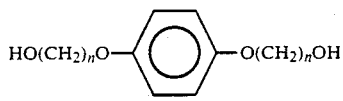

[n is 1 or 2]

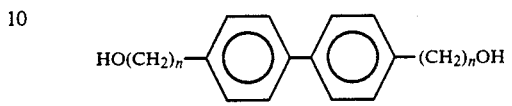

[n is 1 or 2]

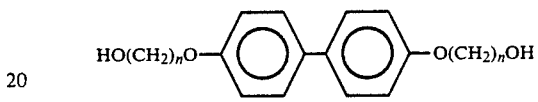

[n is 1 or 2]

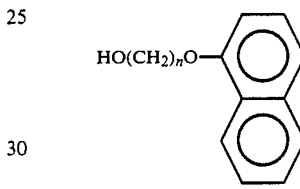

[n is 1 or 2]

Lactone based polyester polyols in which anionic functional groups form intramolecular salts may be produced by introducing such functional groups into lactams such as s-caprolactam, α-methyl-1-caprolactam, s-methyl-s-caprolactam and γ-butryolactam.

Polyether polyols in which anionic functional groups form intramolecular salts may be produced by introducing such functional groups into ethylene oxide, propylene oxide, butylene oxide, etc.

Anionic functional groups that form intramolecular salts may be exemplified by a betaine group which is to be described later in this specification.

Polyester polyols in which anionic functional groups form intramolecular salts are described below in a more specific manner. Common polyesters are synthesized by performing condensation reaction between aliphatic or aromatic polyfunctional acids or acid components having derivatives of such polyfunctional acids and aliphatic or aromatic polyhydric alcohol components. The intramolecular amphoteric base (e.g. betaine group) to be used in the present invention may be contained in either the acid component or the alcohol component described above. Polyester polyols may also be prepared by a polymer reaction in which a polar group such as a betaine group is introduced into a polymer. However, for the purposes of minimizing the unreacted component and achieving efficient introduction of anionic functional groups, using polymeric monomers containing such functional groups is preferred since they are easier to control.

Illustrative betaine groups include a sulfobetaine group, a phosphobetaine group and a carboxybetaine group, with those containing a sulfobetaine or phosphobetaine group being more preferred. These betaine type functional groups may be represented by the following general formulas:

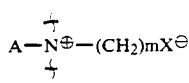  (I)

+: indicating the presence in the urethane chain;
X: —SO₃, —O—SO₃, —COO, —O—PO₃H, —OPO₃, —OPO₂H₂;
A: hydrogen of C₁₋₆₀ alkyl (e.g. methyl or ethyl)
m: interger of 1-10.

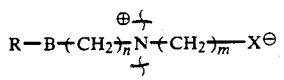  (II)

B: —COO— or —COHN—;
R: C₁₋₁₂ alkyl, alkenyl or aryl;
n,m: integer of 1-10.

Usable betaine-group containing monomers are listed below but it should be understood that the polyurethane resin that can be used in the present invention is by no means limited to those using such monomers:

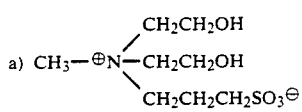

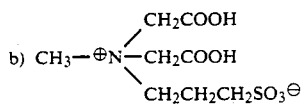

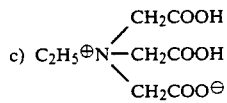

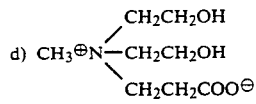

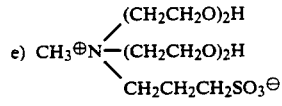

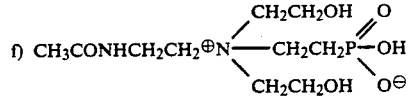

Monomers in which anionic functional groups form intramolecular salts are commercially available but they may readily by synthesized by the following methods:
1) using monochloroacetic acid

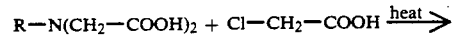

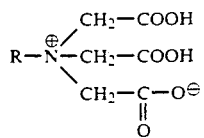

R=alkyl group such as methyl or ethyl;
2) using monochlorosuccinic acid

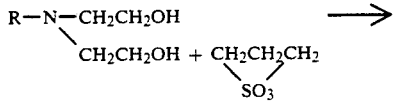

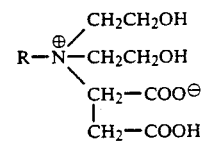

3) using propane sultone

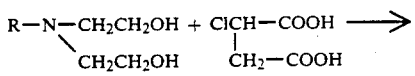

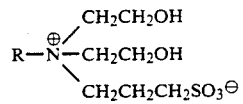

We now describe the polymer reaction for introducing a polar group such as a betaine group into a polymer. In this reaction, a polyurethane that is chain-extended to a predetermined molecular weight is first prepared by polymerization reaction, then a compound having a polar group such as a betaine group is reacted with OH groups present either at the terminal end or in side-chains of said polyurethane. In this case, a compound having a hydroxyl group and a polar group such as a betaine group is first synthesized and it is then reacted with an equimolar amount of a polyfunctional isocyanate such as diisocyanate so as to obtain the reaction product between one of the two NCO groups in the diisocyanate and the hydroxy group in said compound. By subsequent reaction between the OH group in polyurethane and the unreacted NCO group, a polyurethane can be obtained into which a polar group such as a betaine group has been introduced.

The following are non-limiting examples of the compounds having both a hydroxyl group and a betaine group;

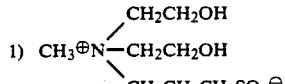

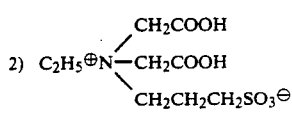

-continued

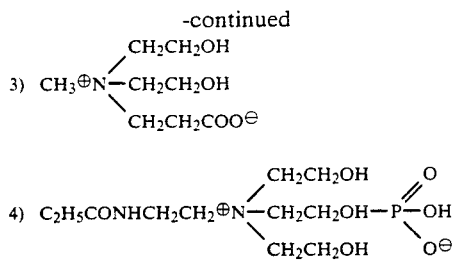

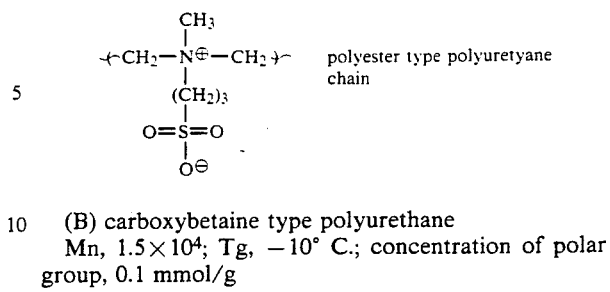

A polar group such as betaine group is preferably introduced into the modified polyurethane based copolymer in an amount of 0.01–1.0 mmol/g, more preferably 0.1–0.5 mmol/g. If less than 0.01 mmol/g of the polar group is introduced, the resin will not prove to be satisfactorily effective in dispersing ferromagnetic particles. If more than 1.0 mmol/g of the polar group is introduced, intermolecular or intramolecular agglomeration is more likely to occur and not only is the dispersability of magnetic particles affected adversely but also solvent selectivity develops to potentially make it possible to use common general-purpose solvents.

The modified polyurethane based copolymer to be used in the present invention preferably has a number average molecular weight in the range of rom 5000 to 10000, with the range of 10000–40000 being more preferred. If the number average molecular weight of the polyurethane resin is less than 5000, the resin will not have a desired film-forming capability. If its number average molecular weight exceeds 10000, problems can arise in the preparation of paints (coating solutions) or in such steps as mixing, transfer and applications.

Synthesis Example

One mole of N-methyl diethanolamine was reacted with one mole of propane sultone at 120° C. for 3 h to obtain a sulfobetaine type polyfunctional monomer. Adipic acid (1.5 moles), 1,4-butanediol (1.7 moles) and said sulfobetaine type base were heated over a period of about 3 h, followed by reaction at 200° C. for 4 h. The unreacted starting materials were removed at 3–5 mmHg and the reaction was carried out to attain an acid value of 2 or below. The resulting copolymer polyester (165 g) was dissolved in 300 parts of methyl ethyl ketone and after adding 80 parts of disphenyl methane diisocyanate, reaction was performed at 80° C. for 2 h. After adding 20 parts of 1,4-butanediol, the reaction was continued for 2 h. Then, 4, parts of 1,3-butanediol was added and reaction was performed for 1 h. The polyurethane obtained has a weight average molecular weight (Mw) of $3.5 \times 10^4$ and a number average molecular weight (Mn) of $2.2 \times 10^4$.

Polyurethane (A) listed below were also synthesized by the method of synthesis described above, and polyurethanes (B) and (C) listed below were also synthesized by similar methods.

(A) sulfobetaine type polyurethane

Mn, $2.2 \times 10^4$; Tg, $-20°$ C.; concentration of polar group, 0.04 mmol/g (B) carboxybetaine type polyurethane Mn, $1.5 \times 10^4$; Tg, $-10°$ C.; concentration of polar group, 0.1 mmol/g

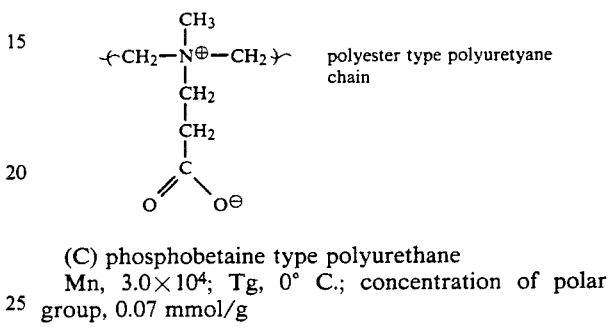

(C) phosphobetaine type polyurethane

Mn, $3.0 \times 10^4$; Tg, $0°$ C.; concentration of polar group, 0.07 mmol/g

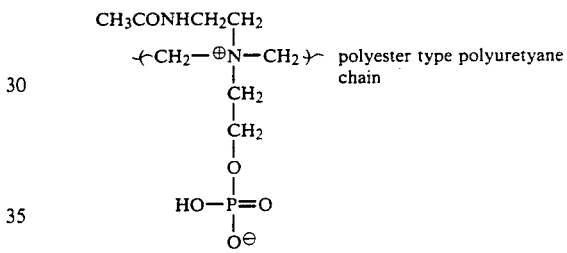

The durability of the magnetic layer and other constituent layers in the magnetic recording medium of the present invention can be improved by blending the above-described modified vinyl chloride based copolymer and modified polyurethane based copolymer. If a modified polyurethane base copolymer having a molecular weight in excess of $6 \times 10^4$ is used, the dispersability of fine magnetic particles will be impaired. If, on the other hand, a modified polyurethane based copolymer having a molecular weight not exceeding $6 \times 10^4$ is blended with the modified vinyl chloride based copolymer, the dispersability of fine magnetic particles is sufficiently improved to lower the viscosity of paint.

For better dispersability, the modified vinyl chloride based copolymer must be used in an amount of at least 30% of the total weight of binder resins including the polyurethane resin. With the durability and physical properties of magnetic film taken into account, the modified vinyl chloride based copolymer may preferably be used in amounts up to 80% of the total weight of binder resins. Modified polyurethane based copolymer having molecular weights not exceeding $6 \times 10^4$ are preferably used in such amounts that the weight ratio of PU (modified polyurethane based copolymer) to VCl (modified vinyl chloride based copolymer) is in the range of from 80:20 to 20:80, with the range of 50:50 to 30:70 being more preferred. Polyurethane based copolymers with molecular weights not exceeding $6 \times 10^4$ which are to be blended with the modified vinyl chloride based copolymer may be selected from among those having known structures, such as polyester polyurethane, polycarbonate, polyurethane, polylactone polyurethane and polyether polyurethane but it should be understood that these are not the sole examples that can be used.

By blending the modified vinyl chloride based copolymer with modified polyurethane based copolymers having molecular weights not exceeding $6 \times 10^4$, the crosslink density of the binder system and its Young's modulus are also improved.

Besides the binder resins described above, either unmodified vinyl chloride based resins, polyurethane resins or polyester resins or those resins which have been modified by merely introducing polar groups may be used as required. It is also possible to use cellulosic resins, phenoxy resins, or thermoplastic resins, thermosetting resins, reactive resins, electron beam curable resins and other resins that need be used in certain specified manners.

The resins described above have their own merits and demerits but as long as optimum types and quantities are selected, their merits are enhanced while their demerits cancel each other to provide an effective binder system for coated layers (magnetic layer and intermediate layer) in the magnetic recording medium of the present invention such as the back coat, the protective layer and the adhesive layer.

In the present invention, an aromatic or aliphatic polyisocyanate may be contained as a curing agent for binder resins described above. Useful aromatic polyisocyanates are tolylene diisocyante (TDI) and addition products of polyisocyanates and active hydrogen compounds. Advantageous aromatic polyisocyanates are those having average molecular weights in the range of from 100 to 3000. Useful aliphatic polyisocyanates are hexamethylene diisocyanate (HMDI) and addition productions of isocyanates and active hydrogen compounds. Among these aliphatic polyisocyanates and addition products of polyisocyanate and active hydrogen compounds are those which have molecular weights in the range of from 100 to 3000. Particularly preferred aliphatic polyisocyanates are non-alicyclic polyisocyanates and addition products of these compounds with active hydrogen compounds.

The polyisocyanates described above may be added in amounts ranging from 1/20 to 8/10, preferably from 1/10 to ½, of the total weight of the binder.

When the magnetic recording medium of the present invention has an intermediate layer, a dispersant may be contained in the intermediate layer. Illustrative dispersants that can be used in the intermediate layer of the present invention include lecithin, phosphate esters, amine compounds, alkyl sulfates, aliphatic acid amides, higher alcohols, polyethylene oxide, sulfosuccinic acid, sulfosuccinate esters, known surfactants and salts of these compounds. Salts of polymeric dispersants having anionic organic groups (e.g. —COOH and —PO$_3$H) may also be used. These dispersants may be used either on their own or as admixtures. These dispersants are generally added in amounts ranging from 1 to 20 parts by weight per 100 parts by weight of binder.

In the coated layers of the present invention, antistats may be used. Example of the antistats include electroconductive powders such as the carbon black described herein, graphite tin oxide-antimony oxide compounds, and titanium oxide-tin oxide-antimony oxide compounds; natural surfactants such as saponin; nonionic surfactants such as alkylene oxide compounds, glycerin compounds and glycidol compounds; cationic surfactants such as higher alkylamines, quaternay ammonium salts, pyridine and other heterocyclic compounds, phosphonium compounds, and sulfonium compounds; anionic surfactants containing acidic groups such as carboxylic acid group, sulfonic acid group, phosphoric acid group, sulfate ester and phosphate ester groups; and amphoteric surfactants such as amino acids, aminosulfonic acids, as well as sulfate or phosphate esters of amino alcohols.

When the magnetic recording medium of the present invention has magnetic layers of two-layer constitution consisting of an upper layer and a lower layer on a nonmagnetic base support, it suffices if the above-mentioned modified copolymer which is a binder is contained in at least one of said two layers.

The magnetic recording medium of the present invention is preferably such that the upper magnetic layer has introduced therein a modified copolymer having an anionic functional group which forms an intramolecular salt, and the lower magnetic layer does not contain a curing agent.

In such magnetic recording medium, both the dispersability of the magnetic particles and the adhesion of the magnetic layers are increased and the upper layer is cured, with the result that, by the synergistic effect of these, the running durability of the medium is strikingly improved and the shedding of magnetic particles is prevent, whereby the clogging of the magnetic head and the dropout are improved to a high extent.

The cause for the improvement in said adhesion is not clear, but it is thought to be due to the amphoteric functional group of the modified copolymer and to the non-use of a curing agent in the lower magnetic layer.

The thickness of the upper magnetic layer is preferably 0.5 to 1.5 $\mu$m, and the thickness of the lower magnetic layer which does not contain a curing agent is preferably 1.5 to 2.5 $\mu$m.

The incorporation of a curing agent in the upper magnetic layer is particularly preferred in the point of improving durability. A preferred curing agent is a heat curing agent, particularly the above-mentioned polyisocyanate curing agent.

In the upper magnetic layer, the specific surface area of magnetic particles is preferably 30 to 65 m$^2$/g, more preferably 35 to 60 m$^2$/g, in terms of BET value, and the coercivity Hc is preferably 600 to 1100 oersteds, more preferably 450~1000 oersteds. In the lower magnetic layer, the specific surface area of magnetic particles is preferably 15 to 50 m$^2$/g, more preferably 20 to 45 m$^2$/g, in terms of BET value, and the coercivity Hc is preferable 400 to 800 oersteds, more preferably 450 to 750 oersteds.

The amount of the modified polyurethane based copolymer having introduced therein an anionic functional group which forms an intramolecular salt, that is used in the present invention is preferably 100 to 1 parts by weight more preferably 50 to 2 parts by weight, with respect to 100 parts by weight of magnetic particles.

When the magnetic recording medium of the present invention consists of magnetic layers having two-layer constitution, that is, upper and lower layers, at least one of said magnetic layers may have coarse carbon black particles having an average particle size of 40 m$\mu$ or more and fine carbon black particle having an average particle size of 15 to 30 m$\mu$ dispersed in the above-mentioned modified polyurethane based copolymer. By so doing, it is possible to make the magnetic layer surface rough to the desired degree and simultaneously therewith to prevent the medium from being charged, to impart an appropriate degree of lubricity, to reduce frictional coefficient, and to improve running durability. Moreover, it is also possible to obtain a good electromagnetic property at the same time.

The ratio of the content in the magnetic layer of carbon black particles having an average particle size of 15 to 30 mµ to that of carbon black particle having an average particle size of 40 mµ or more is preferably 9:1 to 1:9, more preferably 2:8 to 8:2. The ratio of the total amount of carbon black particles to the content of modified polyurethane based copolymer having introduced therein an anionic functional group in the magnetic layer is preferably 1:1 to 1:100, more preferably 1:1 to 1:30.

As the carbon black particles having an average particle size of 10 to 30 mµ, those having an average particle size of 15 to 25 mµ are more preferable.

As the carbon black particles having an average particle size of 40 mµ or more, those having an average particle size of 45 to 60 mµ are more preferable.

The amount of carbon black particles to be used is preferably 0.1 to 10 parts, more preferably 0.2 to 5 parts, in total weight with respect to 100 parts by weight of magnetic particles.

The above-mentioned "average particle size" may be measured by directly counting the particles selectively with an electron microscope, or may be measured from the distribution of particles having different particle sizes by using laser beams or the like. The average particle size may also be calculated as spherical shapes from the specific surface area.

The modified vinyl chloride based copolymer and modified polyurethane based copolymer of the present invention may be used in combination with the known binders mentioned hereinabove.

The mixing ratio of said modified polyurethane based copolymer having a betaine group to a known binder when these are used in combination is usually 10:90 to 90:10, preferably 20:80 to 50:50, in terms of the weight ratio of (betaine group-containing polyurethane): (known binder). If the mixing ratio deviates from the above-mentioned range, it sometimes occurs that the electromagnetic property of magnetic layer of the magnetic recording medium deteriorates, or the dispersibility of the magnetic particles lowers.

The magnetic layer of the present invention contains at least magnetic particles and a binder and may optionally use a dispersant, a lubricant and some other necessary ingredients.

Various ferromagnetic materials may be used as selected from among oxide magnetic materials such as $\gamma$-$Fe_2O_3$, Co-doped $\gamma$-$Fe_2O_3$, Co-coated $\gamma$-$Fe_2O_3$, $Fe_3O_4$, Co-doped $Fe_3O_4$, Co-coated $Fe_3O_4$ and $CrO_2$; and metallic magnetic particles based on Fe, Ni, Co or Al as exemplified by Fe, Ni, Co, Fe-Ni alloys, Fe-Co alloys, Fe-Al alloys, Fe-Al-Ni alloys, Fe-Ni-P alloys, Fe-Ni-Co alloys, Fe-Mn-Zn alloys, Fe-Ni-Zn alloys, Fe-Co-Ni-Cr alloys, Fe-Co-Ni-P alloys, Co-Ni alloys, Co-P alloys, and Co-Cr alloys. These metallic magnetic particles may contain such additives as Si, Cu, Zn, Al, P and Cr in either elemental or compound form. Hexagonal ferrite such as barium, ferrite, as well as iron nitride can also be used.

Binders, curing agents, dispersants, antistats and fillers to be incorporated in the magnetic layer may be selected from among those which were described in connection with the intermediate layer. Common lubricants may be used.

Abrasives may also be added to the magnetic layer as required. Common abrasives will suffice and they may be exemplified by fused alumina, silicon carbide, chromium oxide, corundum, artificial corundum, synthetic diamonds, garnet, emery (chiefly made of corundum and magnetite), etc. These abrasives generally have an average particle size of 0.05–5 µm, with the range of 0.1–2 µm being particularly preferred. These abrasives are added in amounts ranging from 1 to 20 parts by weight per 100 parts by weight of magnetic powder.

The solvents to be incorporated in the coating solutions for intermediate and magnetic layers and the diluting solvents to be used in applying such coating solutions may be selected from among various known solvents as listed below: ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate and ethylene glycol monoacetate; ethers such as glycol dimethyl ether, glycol monoethyl ether, dioxane and tetrhydrofuran; aromatic hydrocarbons such as benzene, toluene and xylene; and halogenated hydrocarbons such as methylene chloride, ethylene chloride, carbon tetrachloride, chloroform and dichlorobenzene.

Exemplary support materials that can be used in the present invention include: polyesters such as polyethylene terephthalate and polyethylene-2,6-naphthalate; polyolefins such as polypropylene; cellulose derivatives such as cellulose triacetate and cellulose diacetate; and plastics such as polyamides and polycarbonates. Also usable are metals (e.g. Cu, Al and Zn), glass, boron nitride, silicon carbide and ceramics.

Base supports made of these materials have thicknesses of from about 3 to 100 µm, preferably 5–50 µm, if they are in a film or sheet form, and thicknesses of from about 30 µm to 10 mm if they are in a disk or card form. Drum-shaped supports are cylindrical. The specific type of support is determined by the recorder used.

An intermediate layer may be provided between the support and the back coat or the magnetic layer in order to improve the adhesion between the two members.

The layers described above may be formed by various application methods which include, but are not limited by, air doctor coating, blade coating, air-knife coating, squeeze coating, dip coating, reverse roll coating, transfer roll coating, gravure coating, kiss coating, cast coating, spray coating and extrusion coating.

The following examples are provided for the purpose of further illustrating the present invention but are in no way to be taken as limiting.

EXAMPLES 1–4 AND COMPARATIVE EXAMPLES 1 AND 2

The ingredients of Recipe II (for paint of intermediate layer) shown in Table 2 were dispersed with a ball mill for 24 h to formulate a paint for intermediate layer. The paint was applied with a reverse roll coater to polyethylene terephthalate bases (13 µm thick) to form an intermediate layer (undercoat) having a thickness of 1.0 µm on a dry basis, which undercoat was then dried.

The ingredients of Recipe I (see Table 1) for magnetic paint were thoroughly mixed and dispersed with a ball mill. After adding 6 parts of a polyfunctional isocyanate as a curing agent, the paint was passed through a 1-µm filter and applied to the polyethylene terephthalate bases with a reverse roll coated to form a magnetic layer in a dry thickness of 4.5 μm. The resulting film specimens were supercalendered.

These specimens were slit to a width of ½in, thereby fabricating tape sample Nos. 1-4 of the present invention and comparative tape sample Nos. 1 and 2.

| Recipe I (magnetic paint) | |
|---|---|
| Component | Parts by weight |
| Co-doped $\gamma\text{-}Fe_2O_3$ | 100 |
| Polyurethane | 8 |
| Vinyl chloride-vinyl acetate copolymer | 12 |
| Myristic acid | 0.8 |
| Stearic acid | 0.8 |
| Alumina | 5 |
| Carbon black | 0.5 |
| Lecithin | 4 |
| Cyclohexanone | 40 |
| Methyl ethyl ketone | 60 |
| Toluene | 60 |

TABLE 1

| Betaine type copolymer (in parts by weight in Recipe I) | | | | | | |
|---|---|---|---|---|---|---|
| | Example | | | | Comparative Example | |
| Binder (mol. wt.) | 1 | 2 | 3 | 4 | 1 | 2 |
| Sulfobetaine type PU ($2 \times 10^4$) | 8 | — | — | 4 | — | — |
| Phosphobetaine type PU ($3 \times 10^6$) | — | 8 | — | — | — | — |
| Carboxybetaine type PU ($8 \times 10^9$) | — | — | 8 | — | — | — |
| Phosphobetaine type VCl ($3 \times 10^4$) | — | — | — | 4 | — | — |
| Sulfonic acid modified PU ($2 \times 10^4$) | — | — | — | — | 8 | — |
| Carboxylic acid modified PU ($3 \times 10^4$) | — | — | — | — | — | 8 |

PU: polyurethane;
VCl: vinyl chloride-vinyl acetate copolymer

TABLE 2

| Recipe II: Paint for intermediate layer | |
|---|---|
| Component | Parts by weight |
| Vinyl chloride-vinyl acetate copolymer | 30 |
| Sulfobetaine type PU | 20 |
| Carbon black | 50 |
| Isocyanate | 10 |
| Cyclohexanone | 200 |
| Toluene | 200 |

The characteristics of the samples were evaluated and the results are shown in Table 3 below.

TABLE 3

| | Sample | | | | | |
|---|---|---|---|---|---|---|
| | Example | | | | Comparative Example | |
| Characteristics | 1 | 2 | 3 | 4 | 1 | 2 |
| Surface roughness ($\times 10^{-3}$ μm) | 8 | 9 | 9 | 7 | 9 | 11 |
| Surface resistivity ($\times 10^{10}$ Ω) | 2 | 1 | 3 | 1 | 9 | 15 |
| Chroma S/N (dB) | +0.5 | +0.6 | +0.4 | +0.6 | 0 | −0.5 |
| Dropout (15-μs pulses per minute) | | | | | | |
| Virgin | 4 | 7 | 6 | 6 | 9 | 8 |
| after 200 | 7 | 9 | 10 | 9 | 25 | 33 |

TABLE 3-continued

| | Sample | | | | | |
|---|---|---|---|---|---|---|
| | Example | | | | Comparative Example | |
| Characteristics | 1 | 2 | 3 | 4 | 1 | 2 |
| passes | | | | | | |

Sample Nos. 1-4 which contain carbon black in accordance with the present invention had small frictional coefficients both in the virgin state and after 200 passes. They also experienced very small amounts of back coat wear and tape damage. Further, they were capable of consistent running and exhibited good skew and jitter characteristics. Because of high uniformity of dispersion it had, the magnetic layer of each of these samples was very low in surface roughness and this enabled sample Nos. 1-4 to be immune from deterioration of chroma S/N ratio and to exhibit satisfactory endurance in repeated running.

On the other hand, comparative sample Nos. 1 and 2 which did not contain carbon black in accordance with the present invention had high frictional coefficients and were not capable of consistent running, nor did they have good skew or jitter characteristics. Further, they were poor in chroma S/N ratio.

Methods of measurement (a) Surface roughness, RA (μm): Using a three-dimensional roughness meter Model SE-3FK (Kosaka Laboratory Co., Ltd.), the sample's surface was measured for a length of 2.5 mm at a cutoff value of 0.25 mm and at a stylus pressure of 30 mg.

(b) Chroma S/N ratio: After recording with HR-7100 (Victor Company of Japan, Ltd.) at a maximum recording current and at 4.5 MHz video was played back and the resulting noise voltage was measured.

(c) Dropout: Using a dropout counter Model "Shibasoku VHO 1BZ", the number of 15 μs dropouts per minute was counted both in the virgin state and after 200 passes.

(d) Electric resistance: A slit tape was held between 5-cm wide electrodes and its surface resistance was measured at a voltage of 500 volts with a load being applied to both ends of the tape.

EXAMPLE 5

Preparation of sulfobetaine group-containing polyurethane

One mole of N-methyl diethanolamine was reacted with one mole of propane sultone at 120° C. for 3 h to obtain a sulfobetaine type polyfunctional monomer. Adipic acid (1.5 moles), 1,4-butanediol (1.7 moles) and said sulfobetaine type polyfunctional monomer (0.06 mole) were charged and heated from 150° C. to 200° C. over a period of about 3 h, followed by reaction at 200° C. for 4 h. The unreacted starting materials were removed at 3-5 mmHg and the reaction was carried out to attain an acid value of 2 or below. The molecular weight (Mw) of the resulting copolymer polyester was 2500. This copolymer polyester (165 g) was dissolved in 300 parts of methyl ethyl ketone and after adding 80 parts of diphenyl methane diisocyanate, reaction was performed at 80° C. for 2 h. After adding 20 parts of 1,4-butanediol, the reaction was continued for 2 h. Then, 4 parts of 1,3-butanediol was added and reaction was performed for 1 h to obtain a sulfobetaine group-containing polyurethane. The polyurethane obtained had a weight average molecular weight (mw) of $3.5 \times 10^4$ and a number average molecular weight (Mn) of $2.2 \times 10^4$.

Preparation of magnetic recording medium

The lower layer ingredients and the upper layer ingredients shown below were fully mixed and dispersed with a ball mill to formulate a magnetic paint.

|  | Parts by weight |
|---|---|
| Lower layer ingredients |  |
| Co-γ-$Fe_2O_3$ magnetic particles (BET value 50 $m^2/g$, Hc 800 Oe) | 100 |
| Polyurethane resine (containing sulfobetaine group) as binder | 7 |
| Stearic acid | 1 |
| Vinyl chloride copolymer containing potassium sulfonate (MR 110, product of Nippon Zeone Co.) | 15 |
| $Al_2O_3$ | 6 |
| Carbon black | 1 |
| Butyl stearate | 1 |
| Myristic acid | 1 |
| Cyclohexanone | 100 |
| Methyl ethyl ketone | 75 |
| Toluene | 75 |
| Upper layer ingredients |  |
| Co-γ-$Fe_2O_3$ magnetic particles | 100 |
| Polyurethane resine (containing sulfobetaine group) as binder | 7 |

Other ingredients and the same in kind and mixing amount as the lower layer ingredients (alumina and carbon black are not added)

The lower layer magnetic paint obtained was applied to polyethylene terephthalate bases (14 μm thick), and thereafter the upper layer magnetic paint was applied onto the lower layer magnetic paint while in undried condition. Then the magnetic field of the coated magnetic layers were oriented and, after further drying, supercalendered to form a lower layer of 2.7 μm, thick and an upper layer of 0.3 μm thick. The resulting film for magnetic tape was measured for various characteristics as a tape for video use. The results are shown in table 4. Said characteristics were measured in the following manner:

(a) RF-output, luminance S/N, chroma S/N and chroma output

Expressed with a value (dB) for a reference tape (Konica Corporation) with a deck "HR-S7000" (Victor Company of Japan, Ltd.) by using a color video noise meter "Shibasoku 925 D/1".

The frequency of each signal was as follows:

| RF-Output | 6 MHz |
|---|---|
| Luminance S/N | 6 MHz |
| Chroma S/N | 629 KHz |
| Chroma output | 629 KHz |

(b) HiHi audio output

Expressed with a value (dB) for said reference tape by using a deck "BR-S711" (Victor Company of Japan, Ltd.). The frequency of output signal was 1.7 MHz.

(c) Linear audio output

Expressed with a value (dB) for said reference tape by using a deck "13R-S711" (Victor Company of Japan, Ltd.). The frequency of this output signal was 1 kHz.

EXAMPLE 6

A magnetic tape was prepared in the same manner as in Example 5 except that a polyurethane resin "Estan 5701F" (Goodrich Company) was used as a lower layer binder, and was measured for various characteristics as in Example 5. The results are shown in Table 4.

EXAMPLE 7

A magnetic tape was prepared in the same manner as in Example 5 except that $Al_2O_3$ as non-magnetic particles and carbon black were added to the upper layer magnetic paint in amounts of 1% and 0.2% (each in weight percent with respect to the magnetic particles), respectively, and was measured for various characteristics as in Example 5. The results are shown in Table 4.

COMPARATIVE EXAMPLE 3

A magnetic tape was prepared in the same manner as in Example 5 except that polyurethane resin "Estan 5701F" (Goodrich Company) was used as a binder for upper and lower layers, and was measured for various characteristics as in Example 5. The results are shown in Table 4.

COMPARATIVE EXAMPLE 4

A magnetic tape was prepared in the same manner as in Comparative Example 3 except that $Al_2O_3$ and carbon black were added to the upper layer magnetic paint in amounts of 4% and 0.5% (each in weight percent with respect to the magnetic particles), respectively, and was measured for various characteristics as in Comparative Example 3. The results are shown in Table 4.

TABLE 4

|  | Example 5 | Example 6 | Example 7 | Comparative Example 3 | Comparative Example 4 |
|---|---|---|---|---|---|
| Upper layer binder | Polyurethane containing sulfobetaine group | Polyurethane containing sulfobetaine group | Polyurethane containing sulfobetaine group | Polyurethane | Polyurethane |
| Lower layer binder | Polyurethane containing sulfobetaine group | Polyurethane | Polyurethane containing sulfobetaine group | Polyurethane | Polyurethane |
| $Al_2O_3$ (lower layer) | None | None | 1% added | None | 4% added |
| Carbon black (lower layer) | None | None | 0.2% added | None | 0.5% added |
| RF output | +2.5 | +2.2 | +2.4 | +1.3 | +0.9 |
| Luminance S/N | +2.4 | +1.9 | +2.3 | +1.0 | +0.7 |
| Chroma output | +1.9 | +1.6 | +1.7 | +1.1 | +0.8 |

TABLE 4-continued

|  | Example 5 | Example 6 | Example 7 | Comparative Example 3 | Comparative Example 4 |
|---|---|---|---|---|---|
| Chroma S/N | +2.0 | +1.7 | +1.7 | +1.1 | +1.0 |
| HiHi audio output | +2.8 | +2.6 | +2.7 | +1.2 | +1.1 |
| Linear audio output | +2.9 | +2.5 | +2.7 | +1.4 | +1.2 |

Remarks:
Polyurethane is Estan 5701F (Goodrich Company).
Addition amounts of $Al_2O_3$ and carbon black, each in weight percent with respect to the magnetic particles.

Evaluation

As is clear from Table 4, the magnetic recording medium of each example of the present invention uses a specific polyurethane as a binder, and, therefore, as compared with the magnetic recording medium of each comparative example using unspecified polyurethane, is improved in the dispersibility of magnetic particles and is superior in both output and electromagnetic properties.

EXAMPLES 8 TO 19 AND COMPARATIVE EXAMPLES 5 TO 8

Preparation of video tape

| Magnetic paint for lower magnetic layer | parts by weight |
|---|---|
| Co-γ-Fe$_2$O$_3$<br>Hc: 650 Oe<br>BET value: 38 m$^2$/g<br>Average particle size: 0.3 μm<br>Resin (shown in Table 5 below) | 100 |
| α-Alumina<br>(average particles size: 0.2 μm) | 5 |
| Carbon black<br>(average primary particle size: 40 mμ) | 1 |
| Myristic acid | 1 |
| Stearic acid | 1 |
| Butyl stearate | 55 |
| Cyclohexanone | 80 |
| Methyl ethyl ketone | 80 |
| Toluene | 80 |

The above-mentioned paint ingredients were kneaded and dispersed to prepare a magnetic paint having a viscosity of 5 to 30 cp.

| Magnetic paint for upper magnetic layer | Parts by weight |
|---|---|
| Co-γ-Fe$_2$O$_3$<br>HC: 800 Oe<br>BET value: 45 m$^2$/g<br>Average particle size: 0.2 μm<br>Resin (shown in Table 5 below) | 100 |
| α-Alumina<br>(average particle size: 0.2 μm) | 5 |
| Carbon black<br>(average primary particle size: 40 mμ) | 1 |
| Myristic acid | 1 |
| Stearic acid | 1 |
| Butyl stearate | 1 |
| Cyclohexanone | 100 |
| Methyl ethyl ketone | 100 |
| Toluene | 100 |

The above-mentioned ingredients were kneaded, dispersed by a ball mill and a sand mill, followed then by the addition of 5 parts by weight of Collonate L (Nippon Polyurethane Industry Co.) to make a viscosity of 2 to 20 cp.

Thereafter, a paint for back coat layer having the following ingredient was applied to the reverse side of the base support with respect to the magnetic layer, etc. to make a dry thickness of 0.4 μm.

|  | Parts by weight |
|---|---|
| Carbon black (Laben 1255)<br>(Coloumbia Carbon Company) | 40 |
| Barium Sulphate<br>(average particle size: 0.10 μm) | 10 |
| Nitrocellulose | 25 |
| N-2301 (Nippon Polyurethane Company) | 25 |
| Collonate (Nippon Polyurethane Company) | 10 |
| Cyclohexanone | 400 |
| Methyl ethyl ketone | 250 |
| Toluene | 250 |

Subsequently, onto a polyethylene terephthalate base film having a thickness of 14.5 μm was applied said magnetic paint for lower magnetic layer and thereon was applied said magnetic paint for upper magnetic layer, then oriented, dried and thereafter calendered to form a lower magnetic layer and an upper magnetic layer in the order mentioned on said base film. The layer thickness after calendering was 1.0 μm for the upper magnetic layer and 2.0 μm for the lower magnetic layer.

Thus a wide magnetic film was obtained and then wound up. This film was cut in ½ inch wide to make the respective video tapes shown in the Table. With respect to the video tape in each Example, the resin used in the upper and lower magnetic layers were varied respectively as shown with symbols in the Table below.

Of said symbols, "I" is a vinyl chloride type resin and "II" is polyurethane; "A" and "B" indicate the resins according to the present invention, and "a" and "b" indicate comparative resins. The magnetic tape of Comparative Example 7 is a base film onto which a paint for upper magnetic layer alone was applied and calendered to make a dry thickness of 4.0 μm. In Comparative Example 8, 5 parts by weight of Collonate L (Nippon Polyurethane Company) was added to the magnetic paint for lower magnetic layer, followed by curing (heating and drying) the resulting magnetic paint.

The resins used are as follows.

Vinyl chloride type resin

1A: The following copolymer (A) containing a sulfabetaine group

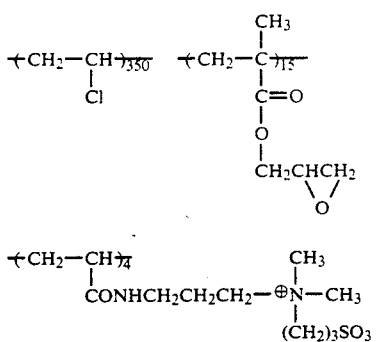

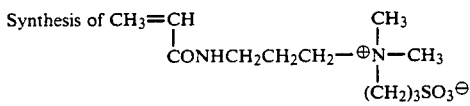

One mol. (156.2 g) of N-(N',N' dimethyl-3-aminopropyl) acryl amido and 300 ml of methanol are charged into a three mouth flask in the presence of 0.5 g of fenothiazine as a polymerization inhibitor and stirred under cooling with ice water.

To the reaction mixture, 112 g (1 mol) of propane sultone and 350 ml of methanol are added. Thereafter, the flask is heated until the system becomes about 60° C. and the mixture is stirred for 10 h.

After completion of the reaction, the reaction product is crystallized, in a large amount of acetone.

| Synthesis of copolymer A | |
|---|---|
| | Parts by weight |
| Deionized waxer | 130 |
| Methyl cellulose | 0.6 |
| Partial ester of polyoxyethylene Sorbitan and aliphatic acid | 0.7 |
| Thichloroethylene | 0.5 |

These ingredients are charged into a polymerization vessel, which is evacuated and degased and charged with 87 parts by weight of vinyl chloride and 20 parts by weight of glycidyl methyl methacrylate, followed by stirring at 58° C. Thereafter, 0.42 parts by weight of 3,3,5-trimethyl, hexanoyl, peroxide is added, to initiate polymerization while at the same time a mixture with 3 parts by weight of the polymerizable betaine monomer, dissolved in 40 parts by weight of methanol, as obtained in the mentioned synthesis is charged continuously at a constant rate so that it will be totally consumed in 8 h. After 12 h of the reaction when the pressure in the polymerization vessel reaches 3 kg/cm², the unreacted vinyl chloride is recovered and the resulting copolymer is recovered after removing the liquid content. The recovered copolymer is washed with cold water and dried to obtain copolymer (A).

Number average molecular weight: 20,000
Tg: +60° C.
Degree of polymerization: 369

1B: Vinyl chloride type resin containing a carboxy betaine group

The following copolymer C was synthesized in the same manner as in 1A except that the monomer was changed.

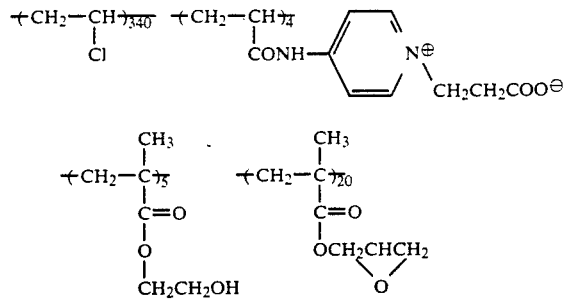

Number average molecular weight: 20,000
Tg: +70° C.
Degree of polymerization: 369

Ia: Vinyl chloride - vinyl acetate - vinyl alcohol copolymer
Ib: Vinyl chloride - vinyl acetate copolymer containing potassium sulfonate.

Polyurethane II

IIA: polyurethane containing a fulfobetaine group
Number average molecular weight: 22,000
Tg: −20° C.
Concentration of polar group 0.04 mmol/g

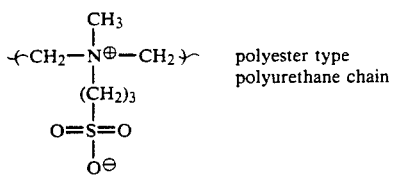

IIB: Polyurethane containing a carboxy betaine group
Number average molecular weight: 15,000
Tg: −10° C.
Concentration of polar group: 0.1 mmol/g

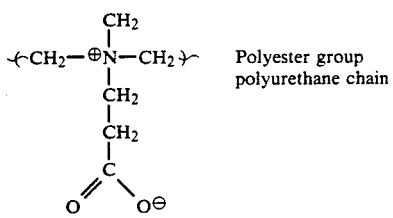

IIa: Polyester polyurethane "Estan 5701" (Goodrich Company)
IIb: Polyester polyurethane containing sodium sulfonate "UR-8300" Toyobo Company)

These video tapes were measured for various properties by the methods below:

Coating property: This shows the coating property when the magnetic paint for upper magnetic layer is applied onto the lower magnetic coated layer or a nonmagnetic base support (Comparative Example 7).

When the lower layer is coated and thereafter the upper layer is coated is succession, or the upper layer and the lower layer are coated at the same time, by a wet-on-wet method, those in which stripes or the like occur in the upper layer are marked "x", and those is which there occur no strips or the like at all are marked "○".

RF output: The output at the time of reproduction in a 100% white signal was sought with the tape of Comparative Example 5 as a reference.

Luminance S/N: The difference in S/N of the samples in a 100% white signal was sought with the tape of Comparative Example 5 as a reference, by use a noise meter (Shibasuku Company).

Still Life: Using NV-6200 (Matsushita Electric Company) the time during which the RF output drops by 1 dB in the still mode was sought.

Durability: The video tape was run 400 times over the whole length under the conditions of temperature 40° C. and humidity 80%, to observe whether or not there was any clogging of the magnetic head or cracking of the tape edges.

Head staining: The video tape was run 400 times over the whole length under the conditions of temperature 45° C. and humidity 80% and thereafter the staining of the magnetic head was visually observed and evaluated in three classes, that is, "○" indicates no staining, "Δ", slightly stained and "x" stained.

Dropout: Using a VTR dropout counted (Shibasoku Company), measurement was made over the whole length of the tape with the output of an RF envelope dropped by 14 dB or more for a long time of 10 μ0 sec or more being counted as one dropout, and the average per minute was sought.

Adhesion with film: An adhesive tape was affixed to the sample surface (magnetic layer side) and thereafter peeled off strongly to observe the sample surface.

| Evaluation | Amounts transferred to the tape |
|---|---|
| ○ | less than 2% |
| Δ | 2~10% |
| x | 10~50% |
| xx | more than 50% |

As shown in Table 5, the video tapes of Example 8 to 19 of the present invention are superior in magnetic properties, whereas those of Comparative Examples 5 and 6 are inferior in coating property, electro-magnetic property, durability, etc. and, in addition, head staining, etc. occur to high extent, and that of Comparative Example 7 is inferior particularly in electromagnetic property and durability. The video tape of Comparative Example 8 is inferior in that there occur head staining and clogging, that there are many dropouts and that the adhesion with the base film is not good.

TABLE 5

| | Resin of upper magnetic layer | | Binder of lower magnetic layer | | Coating property | RF outlet (dB) | Luminance S/N (dB) | Still life (min) | Durability | Head staining | Drop out (10 μsec/ −14 dB) | Adhesion |
|---|---|---|---|---|---|---|---|---|---|---|---|---|
| | Content 10 parts by weight | Content 5 parts by weight | Content 10 parts by weight | Content 5 parts by weight | | | | | | | | |
| Example-8 | Ia | IIA | Ia | IIa | ○ | +1.9 | +2.0 | 120 | Good | ○ | 5 | ○ |
| Example-9 | Ia | IIB | Ia | IIa | ○ | +1.9 | +2.0 | " | " | ○ | 3 | ○ |
| Example-10 | IA | IIa | Ia | IIa | ○ | +1.7 | +1.8 | " | " | ○ | 4 | ○ |
| Example-11 | IB | IIa | Ia | IIa | ○ | +1.7 | +1.8 | " | " | ○ | 6 | ○ |
| Example-12 | Ib | IIA | Ia | IIa | ○ | +2.2 | +2.3 | " | " | ○ | 5 | ○ |
| Example-13 | IA | IIb | Ia | IIa | ○ | +2.3 | +2.4 | " | " | ○ | 4 | ○ |
| Example-14 | Ia | IIA | Ib | IIb | ○ | +2.1 | +2.3 | " | " | ○ | 3 | ○ |
| Example-15 | Ia | IIB | Ib | IIb | ○ | +2.1 | +2.3 | " | " | ○ | 3 | ○ |
| Example-16 | IA | IIa | Ib | IIb | ○ | +2.0 | +2.2 | " | " | ○ | 2 | ○ |
| Example-17 | IB | IIa | Ib | IIb | ○ | +2.0 | +2.2 | " | " | ○ | 4 | ○ |
| Example-18 | Ib | IIA | Ib | IIb | ○ | +2.5 | +2.7 | " | " | ○ | 2 | ○ |
| Example-19 | IA | IIb | Ib | IIb | ○ | +2.5 | +2.7 | " | " | ○ | 2 | ○ |
| Comp. Example-5 | Ia | IIa | Ia | IIa | X | 0 | 0 | 10 | Clogging occurs through 50 passes | X | 57 | Δ |
| Comp. Example-6 | Ia | IIa | Ib | IIb | X | +0.3 | +0.4 | 20 | Clogging occurs through 60 passes | X | 65 | Δ |
| Comp. Example-7 | Ia | IIa | — | — | ○ | −2.0 | −1.9 | 120 | Clogging occurs through 200 passes | Δ | 100 | X |
| Comp. Example-8 | Ia | IIA | Ia | IIa | ○ | +1.8 | +1.9 | 120 | Edge cracking and clogging occur through 30 passes | X | 300 | XX |

Remarks:
*Isocyanate "collonate L" is contained in the lower magnetic layer
comparative Example 7: The thickness of the magnetic layer is 4.0 μm
I indicates a vinyl chloride type resin
II indicates a polyurethane resin

EXAMPLES 20 TO 21 AND COMPARATIVE EXAMPLE 9

| Upper layer A ingredients | Parts by weight |
|---|---|
| Ferromagnetic particles (Co-coated γ Fe$_2$O$_3$; Coercivity Hc = 740 Oe) | 100 |
| Alumina | 10 |
| Carbon black | 5 |
| Lecithin | 5 |
| Potassium sulfonate-containing Vinyl Chloride resin (Nippon Zeone Company MR110) | 15 |

-continued

| Upper layer A ingredients | Parts by weight |
|---|---|
| Sulfobetaine type polyurethane resin | 15 |
| Butyl stearate | 3 |
| Cyclohexanone | 120 |
| Methyl ethyl ketone | 120 |
| Toluene | 120 |

Lower layer B ingredients

Same as above except that the ferromagnetic particles used are Co-coated $Fe_2O_3$, coercivity Hc=650 Oe in an amount of 100 parts by weight.

The above upper and lower layer ingredients were dispersed respectively by a sand mill, followed by the addition of 5 parts by weight of Collonate L (Nippon Polyurethane Co.) to obtain respective magnetic paints A and B. A polyurethane terephthalate film having a thickness of 75 μm was coated first with the magnetic paint B for lower layer and then with magnetic paint A for upper layer. The coated magnetic layers were oriented, dried and thereafter calendered to form an upper layer having a dried thickness of 0.3 μm and a lower layer having a dried thickness of 0.7 μm. From the resulting magnetic medium in sheet form, a disk having a diameter of 3.5 inches was taken out and incorporated in a package by using Kendol 149-007 (Trade mark; unweaved cloth consisting of polyester fibers) as a liner to form a floppy disk sample. This sample was tested for durability at temperature of 5° C., 24° C. and 60° C., respectively, using a drive "JV-394" of Matsushita Electric Company. The results shown in Table 6.

TABLE 6

|  | Durability (hr.) | | | Abnormality occurrence rate (%) |
|---|---|---|---|---|
|  | 5° C. | 24° C. | 60° C. |  |
| Example 20 | 800 | 800 | 600 | 0 |
| Example 21* | 800 | 800 | 600 | 0 |
| Comp. Example 9** | 300 | 300 | 400 | 20 |

Remarks:
*The tape was the same as in Example 20 except that a carboxybetaine type polyurethane resin was used in place of the sulfobetaine type polyurethane resin in Example 20.
**The tape was the same as in Example 20 except that Estan 5701 (Goodrich Company) was used in place of the sulfobetaine type polyurethane resin in Example 20.

The durability and repeating tests were conducted as follows:

Durability Test

After recording under the conditions of disk rotation number 300 rpm, relative velocity 1 m/sec and write-in frequency 125 kHz, the running time in which the reproduction output becomes 70% of the initial output was made the durability time. The test was conducted at 60° C., room temperature (24° C.) and 5° C., respectively. cl Repeating Test With the drive used in the durability test, recording was effected over all tracks, and the abnormality occurrence rate at the time of reading-out twice repeatedly was expressed by the percentage for 100 sheets of each of the respective disk.

EXAMPLES 22 TO 24 AND COMPARATIVE EXAMPLE 10

The following upper and lower layer ingredients were kneaded by a kneader respectively, and thereafter dispersed by a sand mill to prepare respective magnetic paints A and B:

| Magnetic paint A for upper layer | Parts by weight |
|---|---|
| Co-γ-$Fe_2O_3$ | 100 |
| (Hc = 800 Oe, particle size = 0.16 μm) |  |
| Potassium Sulfonate-containing Vinyl chloride resin (MR110, Nippon Zeon Co.) | 10 |
| Sulfobetaine type polyurethane | 5 |
| α-$Al_2O_3$ | 6 |
| (abrasive, average particle size 0.3 μm) |  |
| Carbon blacks A and B |  |
| (average particle size and addition amount are shown in Table 7 below.) |  |
| Myristic acid | 1 |
| Stearic acid | 1 |
| Butyl stearate | 1 |
| Methyl ethyl ketone | 50 |
| Cyclohexane | 150 |
| Toluene | 50 |
| Collonate L | 5 |
| (Nippon Polyurethane Industry Co.) |  |

| Magnetic paint B for lower layer | Parts by weight |
|---|---|
| Co-γ-$Fe_2O_3$ | 100 |
| (Hc = 700 Oe, particle size = 0.24 μm) |  |
| Potassium sulfonate-containing Vinyl chloride resin (MR110, Nippon Zeon Co.) | 10 |
| Sulfobetaine type polyurethane | 5 |
| α-$Al_2O_3$ | 5 |
| (abrasive, average particle size 0.3 μm) |  |
| Carbon blacks A and B |  |
| (average particle size and addition amount are shown in Table 7.) |  |
| Myristic acid | 1 |
| Stearic acid | 1 |
| Butyl stearate | 1 |
| Methyl ethyl ketone | 50 |
| Cyclohexane | 150 |
| Toluene | 50 |
| Collonate L | 5 |
| (Nippon Polyurethane Industry Co.) |  |

Subsequently, onto a polyethylene terephthalate base film having a thickness of 14.5 μm was applied said magnetic paint B for lower magnetic layer and thereon was applied said magnetic paint A for upper magnetic layer, then oriented, dried and thereafter calendered. The upper layer had a dried thickness of 0.5 μm and the lower layer had a dried thickness of 3.0 μm.

Thereafter, a paint for BC layer of the following ingredients was applied to the surface of the reverse side of the base film with respect to the magnetic layers to form a BC layer having a dried thickness of 0.8 μm:

|  | Parts by weight |
|---|---|
| Carbon black (Raven 1035) | 40 |
| Balium sulfate | 10 |
| (average particle size 300 μm) |  |
| Nitrocellulose | 25 |
| N-2301 (Nippon Polyurethane Company) | 25 |
| Collonate L (Nippon Polyurethane Company) | 10 |
| Cyclohexanone | 400 |
| Methyl ethyl ketone | 250 |
| Toluene | 250 |

Thus a wide magnetic film was obtained and then wound up. This film was cut in ½ inch wide to make the respective video takes shown in Table 7. These tapes were then evaluated for the properties mentioned below. The results are shown in Table 7.

TABLE 7

| Magnetic layer | Example 22 | | Example 23 | | Example 24 | | Comp. Example 10 | |
|---|---|---|---|---|---|---|---|---|
| | Particle size (μm) | Addition amount (Parts by weight) | Particle size (μm) | Addition amount (Parts by weight) | Particle size (μm) | Addition amount (Parts by weight) | Particle size (μm) | Addition amount (Parts by weight) |
| Lower layer | | | | | | | | |
| Carbon black A | 20 | 2 | 20 | 2 | 20 | 7 | 20 | 12 |
| Carbon black B | 50 | 7 | 50 | 7 | — | — | — | — |
| Upper layer | | | | | | | | |
| Carbon black A | 20 | 1 | 26 | 1 | 20 | 1 | 27 | 1 |
| Carbon black B | 40 | 1 | — | — | 40 | 1 | — | — |
| RF output (dB) | +2.9 | | +2.9 | | +2.9 | | +2.9 | |
| Luminance S/N (dB) | +2.8 | | +2.7 | | +2.8 | | +2.7 | |
| Chroma output (dB) | +2.1 | | +2.0 | | +2.1 | | +2.0 | |
| Chroma S/N (dB) | +2.1 | | +2.0 | | +2.1 | | +2.0 | |
| Shedding noise (dB) | +1.6 | | +2.1 | | +1.8 | | +4.0 | |
| Head stain | | | | | | | | |
| output drop (dB) | −0.1 | | −0.3 | | −0.2 | | −1.0 | |
| Observation of the head | O | | O | | O | | X | |
| Light transittance | O | | O | | O | | X | |
| Surface specific resistance (× 10$^{10}$ Ω/sq) | 4.8 | | 5.0 | | 4.9 | | 28.0 | |

(a) RF output, Luminance S/N, Chroma S/N and Chroma output

Expressed with a vale (dB) for a reference tape with a deck "HR-S7000" (Victor Company of Japan, Ltd.) using a color video noise meter "Shibasoku 925 D/1."

The frequency of each signal was as follows:

| RF-output | 6 MHz |
|---|---|
| Luminance S/N | 6 MHz |
| Chroma S/N | 629 kHz |
| Chroma output | 629 Khz |

(b) Sedding noise (Conditions for measurement; 20° C., 10%, Measuring deck HR-S7000 of Victor Company of Japan, Ltd.)

(i) The sample tape was reproduced without running, and the system noise was measured with a spectrum analyzer.

(ii) The sample tape was reproduced 10 times each for 1 minute, and the shedding was measured with a spectrum alalyzer.

(iii) With respect to the noise level in the vicinity of 8 MHz, the noise value of 10 passes was read out as an average value with the system noise as a reference (0 dB).

(c) The head stain was measured in the following manner (i) Before measurement, the head was cleaned into a state without any stain.

(ii) A single frequency of 6 MHz was recorded in sample tape No. 1 (unused) for 10 minutes at a recording level of +20% with respect to the reference tape, then, after reproducing three times, a signal frequency of 8 MHz was recorded for two minutes at a recording level of +20% with respect to the reference tape, and this was reproduced to measure its output (the resulting values are made 0 dB.)

(iii) Sample tape No. 2 (unused) was run in SP made while recording a video signal from the beginning of winding to the end of winding at a normal temperature and low humidity 20%.

(iv) A single frequency of No. 1 was recorded again in Sample tape No. 1 for two minute at the same recording level as in (ii) above, and reproduced to measure its output, seaking the difference in output drop from the value (0 dB) measured in (ii) above. Two sample tapes Nos. 1 and 2 were used with respect to one level and measured.

| (Evaluation) | |
|---|---|
| O | There was little or no stain at the glass portion of the head. |
| x | Stain exists on the whole surface of the head. |

(d) Light transmittance

The light shading property of the tape was measured by a light source having a wavelength of 900 nm.

| O | smoothly run to the end of the tape. |
|---|---|
| x | tape stopped on the way or was impossible to run. |

(e) Surface specific resistance

Measured with a static honest meter, type S-4104, of Shishido Company at 100 volts.

What is claimed is:

1. A magnetic recording medium having a plurality of coated layers including a magnetic layer on a support, wherein at least one of said coated layers contains a modified copolymer having introduced therein an anionic functional group which forms an intramolecular salt, wherein said modified copolymer is selected from the group consisting of polyurethane having a betaine group and a vinyl chloride having a betaine group and an epoxy group.

2. A magnetic recording medium according to claim 1 wherein said magnetic layer contains said modified copolymer.

3. A magnetic recording medium according to claim 2 wherein said magnetic layer contains carbon black particles having an average particle size of 15 mμ to 30 m$\mu$ and carbon black particles having an average particle size of at least 40 m$\mu$.

4. The magnetic recording medium of claim 2 wherein an upper magnetic layer contains said modified copolymer and a lower magnetic layer does not contain a curing agent.

5. A magnetic recording medium according to claim 1 wherein said coated layers have an intermediate layer between said support and said magnetic layer, said intermediate layer containing carbon black particles dispersed in a binder.

6. The magnetic recording medium of claim 5 wherein said intermediate layer contains said modified copolymer.

7. A magnetic recording medium having magnetic layer and an intermediate layer provided on each side of a support, said magnetic layer containing at least magnetic particles and a binder, said intermediate layer between said support and said magnetic layer and containing carbon black particles dispersed in a binder, and at least one of said magnetic and intermediate layers on each side of said support containing as a binder a modified copolymer containing an anionic functional group which forms an intramolecular salt, wherein said modified copolymer is selected from the group consisting of a polyurethane having a betaine group and a vinyl chloride having a betaine group and an epoxy group.

* * * * *